United States Patent [19]

Arnold

[11] Patent Number: 4,557,882

[45] Date of Patent: Dec. 10, 1985

[54] METHOD AND APPARATUS FOR EQUALIZING THE DENSITY DISTRIBUTION OF PRESSED WOOD PANELS

[75] Inventor: Dieter Arnold, Darmstadt, Fed. Rep. of Germany

[73] Assignee: Carl Schenck AG., Fed. Rep. of Germany

[21] Appl. No.: 549,455

[22] Filed: Nov. 7, 1983

[30] Foreign Application Priority Data

Nov. 20, 1982 [EP] European Pat. Off. ........ 82110741.4

[51] Int. Cl.[4] ........ B29J 5/04

[52] U.S. Cl. ........ 264/40.4; 264/40.7; 264/112; 425/140; 425/148; 425/172

[58] Field of Search ........ 264/40.4, 40.7, 109, 264/112; 425/140, 148, 172

[56] References Cited

U.S. PATENT DOCUMENTS

| | | | |
|---|---|---|---|
| Re. 30,759 | 10/1981 | Burkner | 264/40.4 |
| 2,822,028 | 2/1958 | Himmelheber et al. | 264/40.4 |
| 3,467,739 | 9/1969 | Underwood et al. | 264/40.4 |
| 3,663,137 | 5/1972 | Haas et al. | 425/148 |
| 4,038,531 | 7/1977 | Loe, Jr. | 425/148 |
| 4,063,858 | 12/1977 | Axer et al. | 264/113 |
| 4,068,991 | 1/1978 | Ufermann et al. | 264/113 |
| 4,155,968 | 5/1979 | Yamamoto et al. | 264/40.4 |
| 4,218,414 | 8/1980 | Hagg et al. | 264/40.4 |
| 4,247,497 | 1/1981 | Wolf | 264/40.4 |

FOREIGN PATENT DOCUMENTS

| | | | |
|---|---|---|---|
| 2157386 | 6/1972 | Fed. Rep. of Germany | 264/109 |
| 2214900 | 10/1973 | Fed. Rep. of Germany . | |
| 2423359 | 1/1975 | Fed. Rep. of Germany | 425/148 |
| 2557352 | 7/1977 | Fed. Rep. of Germany . | |
| 2926087 | 1/1981 | Fed. Rep. of Germany | 264/109 |
| 49-49186 | 12/1974 | Japan | 264/113 |
| 53-52583 | 5/1978 | Japan | 264/40.4 |

OTHER PUBLICATIONS

Wood as Raw Material and Fabrication Material, 40 (1982), p. 385.

*Primary Examiner*—Jeffery Thurlow

*Attorney, Agent, or Firm*—Connolly and Hutz

[57] ABSTRACT

Method and apparatus are provided for equalizing the density distribution of pressed wood panels manufactured from adhesive coated bulk material. A bottom belt hopper has an outlet, the width of which is identical with the spreading width for the pressed wood panels being manufactured. Devices installed below the bottom belt hopper transport the bulk material as adhesive coated chip material onto a forming belt. Density deviations existing in the bulk material when it is removed from the bottom belt hopper are determined and correspondingly eliminated. If required, a density profile for a finished pressed wood panel is provided when the bulk material is taken from the bottom belt hopper.

11 Claims, 8 Drawing Figures

METHOD AND APPARATUS FOR EQUALIZING THE DENSITY DISTRIBUTION OF PRESSED WOOD PANELS

BACKGROUND OF THE INVENTION

The present invention concerns a method for equalizing the density distribution of pressed wood panels manufactured from adhesive coated bulk material and apparatus for accomplishing same.

In the manufacture of pressed wood panels, there is a great economical interest in producing chip material that is spread as evenly as possible, since it is possible only in this manner to ascertain that the properties of the finished pressed wood panels, such as density, bending strength, and transverse tensile strength, for example, are uniform at all points of the end product. Excess quantities of bulk material, adhesive, and energy are thereby eliminated. According to DE-PS No. 22 14 900, which concerns a spreading device for the purpose of equalizing weight variations per surface unit in the lateral direction of chip, fiber or similar material in the manufacture of particle or fiberboard panels, a device is known whereby a feed conveyor belt is used in order to distribute bulk material as chip material to be deposited on a form base. In order to equalize different weights per surface unit in the lateral direction of chip or fiber material, the provision is made that the feed conveyor belt can be adjusted to different elevations, continuously and in the lateral direction. Additional devices of this nature are not appropriate for detection and elimination of variations in the weight per surface unit in the lateral direction of the chip or fiber material, i.e. of the pressed wood panels, as early as in the stage of creating a bulk material stream. Nor is it possible, in this manner, to determine the varying density in the lateral direction of the feed conveyor belt.

A pass-through procedure is known from DE-PS No. 25 57 352 for continuous spreading of particle material of wood chips and/or fibers, consisting of several layers spread separately, the surface weight of which is adjusted to a predetermined nominal value, where the weight of the fully spread particle material is measured and indicated, and whereby corresponding electrical measurement signals control the spreading of at least one layer of particle material to a preset nominal value of the completely spread material. However, in this case, it is similarly impossible to equalize the density distribution in the transverse direction of the particle material. Furthermore, scales for surface weight are known (cf. *Wood as Raw Material and Fabrication Material* 40 (1932), p. 385), whereby the distribution of weight per surface unit in the spread-out wood chip material is determined by means of radiometric methods and devices traversing the material along and across the production direction.

SUMMARY OF THE INVENTION

With the above as background, the purpose of the present invention is a method together with an apparatus for accomplishing the method, namely to determine and eliminate density deviations in the bulk material when it is removed from a hopper with a transport belt at the bottom, and, if required, simultaneously preset a density profile for a finished pressed wood panel already when the bulk material is removed from the hopper with the bottom transport belt. By measuring the weight distribution over the cross section of the removal area and comparing this with a predetermined nominal density distribution of the finished pressed wood panel, a command is generated for deposit, which generally varies over the cross section.

For the production of equally heavy pressed wood panels, which simultaneously have a predetermined nominal density distribution, a control command is derived, according to the invention, from a comparison between the existing surface weight of the pressed wood material and the nominal density distribution, in which the nominal weight of the finished pressed wood panel is contained, whereby the removal of the bulk material from the hopper can be varied.

By means of a measuring surface above a guide surface between the hopper outlet and the subsequent downward transportation devices for the bulk material, information is obtained concerning the momentary density distribution over the form cross section where the material is to be spread. This information in combination with a predetermined density distribution for the finished pressed wood panel, generates a value which, as a control value, influences a deposit device extending over the entire spreading width for removal of excess bulk material spread out as a result of density variations between individual areas over the cross section.

Moreover, by subdividing the measurement surface into individual plates with extended measurement strips, a better approximation of the density profile is achieved over the area where the bulk material is removed from the hopper. According to the invention herein, the density profile obtained in this manner can be equalized by adjusting the individual tongues of the subsequent deposit devices if, for instance, a density profile is required in the finished pressed wood panel over the total width of the panel, which has a constant density value.

According to the invention, the measurement surface proper is developed as a narrow plate which can be moved back and forth over the entire spreading width in front of a guide surface. In one embodiment of this movable narrow plate the device for transverse movement of the plate also extends beyond the spreading width, so that the total device can be taken out from the spreading area for maintenance and adjustment work without any interruption of the spreading process.

In addition to equalizing the density profile, which would result in a slightly lighter finished pressed wood panel, this slight change in the weight of the finished pressed wood panel as compared to the predetermined weight of pressed wood panel is equalized by increasing the removal of bulk material from the hopper by means of increasing the speed of the conveyor belt at the bottom thereof.

A scraping band simultaneously serves as removal element from the hopper, as deposit element, and as return transport element for that proportion of bulk material which was incorrectly removed. Instead of the scraper band, where the scraper ridges are placed on revolving chains or cog belts or rubber belts, the outlet cross section of the hopper with a transport belt at its bottom may also be provided with spiked rollers extending over the total width of the outlet cross section. According to the invention, the spiked outlet roller which is closest to the bottom belt will assume the function of separating the excess of removed bulk material and returning it into the hopper with the bottom belt, namely in conjunction with a bucket transport device, which may be developed as a helical or spiral conveyor.

The attachment of the measuring surfaces as narrow plates guarantee that any soiling of the moving parts for accommodation of the movable narrow plate is impossible. Provisions have also been made, so that the bulk material proper does not obstruct the measuring surface in its measuring activities, e.g. by jamming bulk material between the guide surface and the measuring surface when the measuring surface is moved laterally over the guide surface.

According to the invention, a motor with reversible poles, which is affected by the control commands, or a DC motor, can be used for changing the speed of the transport belt at the hopper bottom.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which.

DETAILED DESCRIPTION OF THE INVENTION

Figure 1:
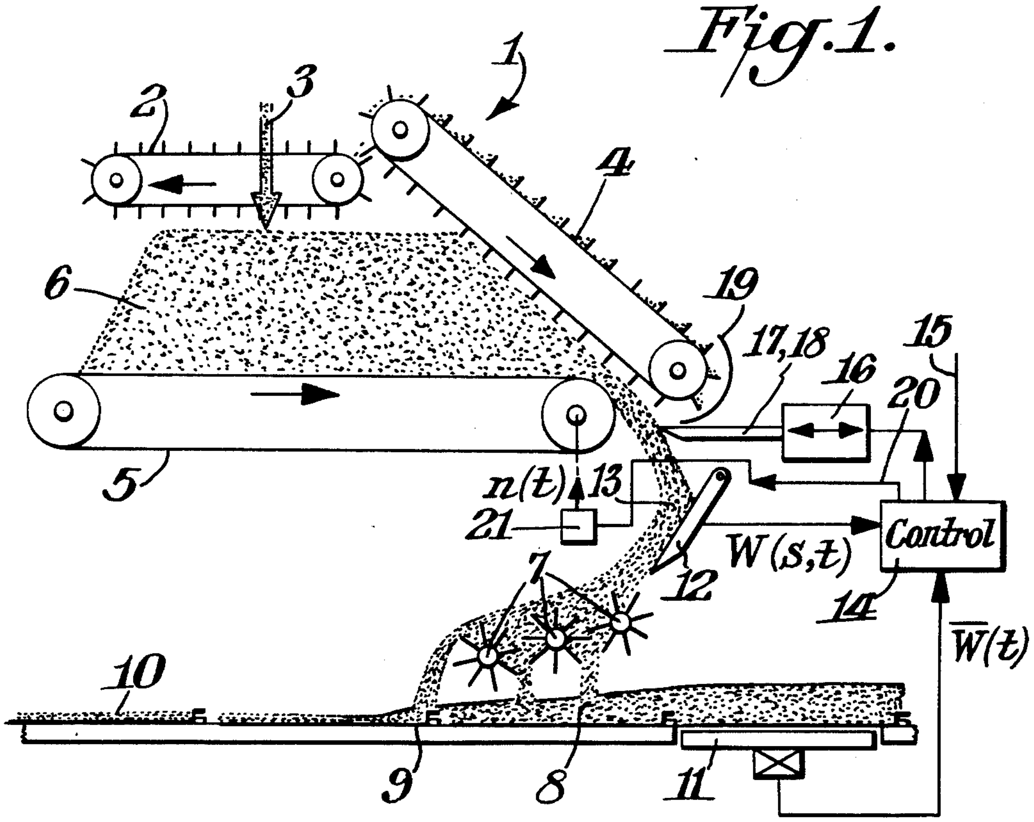
FIG. 1 is a schematic side elevational view of apparatus, according to the present invention.

In an installation for the manufacture of pressed wood panels, e.g. particleboard panels, adhesive coated chips for the manufacturing of a particleboard are fed in the direction of the vertical arrow 3 into a hopper 1 having a conveyor belt at the bottom thereof. Adhesive coated chips are delivered to the bottom belt hopper 1 by a feeder device 2 which rotates in the direction of the arrow.

A scraper belt 4 covers the outlet cross section of the hopper. The scraper belt 4 rotates in the direction of the arrow, and thus, in conjunction with a bottom belt 5 rotating at an adjustable speed, it removes a preselected quantity of bulk material for production of particleboards from the bulk material 6 stored at the front side of the hopper. Instead of the illustrated scraper belt, other feeder devices may also be used, such as plate belts, for example.

The removed bulk material is fed into a spreader unit 7 and subsequently deposited by this spreader unit 7 as adhesive coated chip material 8 onto a forming belt 9. In the further transport of the chip material 8 on the forming belt 9, which is preferably covered with an uninterrupted line of trays 10, the momentary weight of the chip mass is determined by scales 11, either as total weight including the trays, or as pure net weight of the chips, by subtraction of the weight of the trays.

If a greater flow of material is required, a second spreader unit may be provided in addition to the illustrated spreader unit 7, and arranged as a mirror-image of the one represented, or two hoppers with bottom belts may be provided, which supply the spreader units arranged as mirror-images of one another. Instead of these illustrated spreader units which function according to the throw principle, it is also possible to use spreader units which scatter the bulk material used for chip material by means of a blower. Hereby, blower outlet openings may also be arranged in mirror-image formation in a known manner, if this is required because of high volume material flow, and combinations of spreader units according to the throw principles and units according to the wind scattering principle may be utilized in a known manner.

Figure 8:
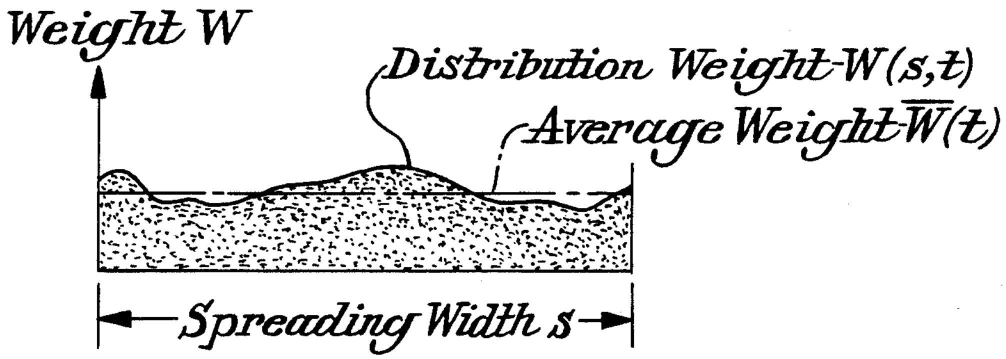
FIG. 8 is a diagram of the weight distribution over the spreading width of the apparatus.
Figure 2:
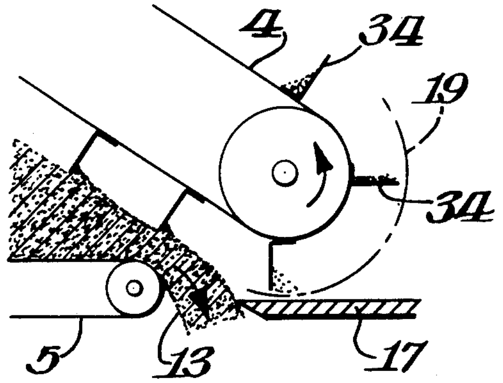
FIG. 2 is an enlarged fragmental side elevational view of the scraper conveyor portion of the apparatus shown in FIG. 1.

Between the bottom belt hopper and the spreader unit 7, there is a measuring surface 12, explained in greater detail below with reference to FIGS. 5 and 6. This measuring surface indicates the weight distribution of the material flow 13 transported over it in one width over the spreading width s (FIG. 8). These values are fed into a control 14 with simultaneous input of a nominal value 15 which contains the total weight of the finished particleboard with uniform density distribution. From the various weight indications for the material 13, which is a measure of varying density distribution in the particleboard, as compared to the constant information of the nominal value 15, a control value will result, which changes over the spreading width and which will be fed into an adjustment device 16. This device then affects tongues 17 of a separator/ deposit device 18 in such a manner that the individual tongues extend over the spreading width more or less corresponding to the distribution (FIG. 8) in the material flow 13. Hereby, particles will collect on the individual tongues, which will then be scraped off from the tongues 17 by means of the scraper belt 4 and returned to the feeder device 2 of the bottom belt hopper 1 in the return movement of the scraper belt 4. It has been found to be advantageous if a guide plate 19 is provided over the total spreading width in the area of the deflection of the scraper 4.

If now the actual weight of a material mass 8 is also fed via the scales 11 into the control 14, and if there is a difference between this actual weight and the nominal weight 15, an adjustment drive 21 with a control command is affected by another output 20 of the control 14, so that a greater material flow 13 is carried out from the bottom belt hopper 1 by means of a change of the speed of the bottom belt 5.

If a series of scraper rollers arranged above one another is used instead of the scraper belt 4, the last scraper roller also has a guide plate 19 as a partial mantle, to which a bucket conveyor, not illustrated, is connected for transporting the return material back into the bottom belt hopper 1. Thereby, the bucket conveyor may be provided with a screw or be designed as a vibrator conveyor. The provision for a guide plate 19 thus prevents that return material from falling back into the material flow 13.

Figure 7:
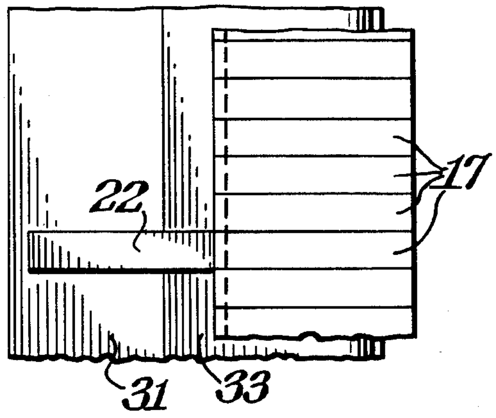
FIG. 7 is a fragmental top plan view in cross section taken along line 7—7 of FIG. 6.
Figure 6:
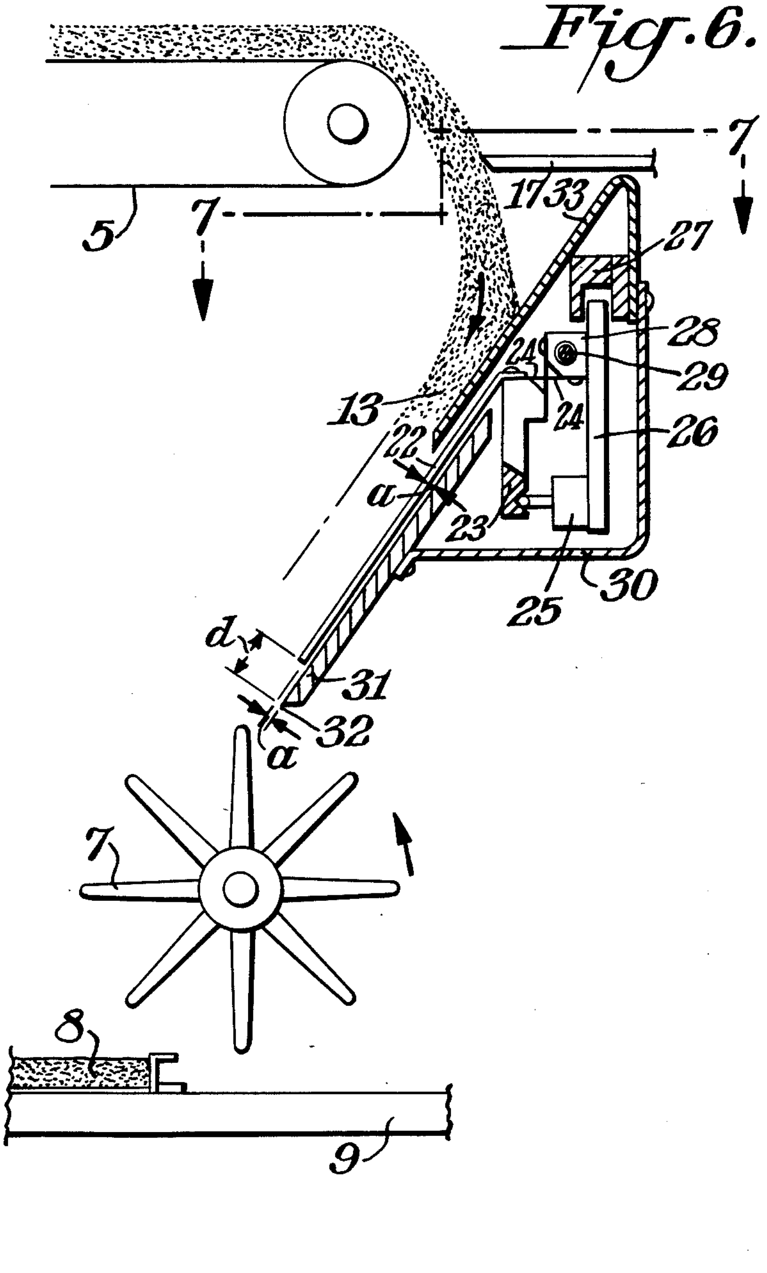
FIG. 6 is an enlarged side elevational view of an alternate arrangement for determining the weight distribution over the spreading width of the apparatus.

The measuring surface illustrated in FIGS. 6 and 7 has a narrow plate 22 which is arranged at a lever 23. The lever 23 is supported on one side on a flexural pivot 24 and on the other side on a support post 26, via a device 25 for force measurement. The support post 26 rests in a bearing in a transverse guide 27 which extends over the total spreading width.

In addition, a screw bolt 28 is fixed on the support post 26, whereby the narrow plate 22 can be moved in conjunction with a screw rod 29 across the spreading width.

A housing 30, which contains the narrow plate 22 and the suspension parts of the narrow plate 22, carries a guide surface 31, in front of which the narrow plate 22 is spaced a distance a. According to the invention, the distance a is selected so that no portion of the material flow can jam between the guide surface 31 and the narrow plate 22, and thus no malfunction of the narrow plate need be anticipated. The narrow plate ends within the guide surface 31, so that no influence of the spreader unit 7 can occur from uneven feed of the material flow 13. In addition, the area b, in which the narrow plate 22 is momentarily located, ends so far above the edge of the guide surface, that this partial material flow 13 can recombine with the rest of the material flow 13 and flow uniformly from the edge 32 of the guide surface 31 to the spreader unit 7.

The housing 30 also has a deflector 33 which, together with the guide surface 31, forms a slot along which the narrow plate 22 can be moved.

As illustrated in FIG. 1, tongues 17 extend into the material flow 13 corresponding to control commands from the control 14, namely in order to remove excess material as described with reference to FIG. 1 and to return this by means of the scraper 4 or a scraper roller into the bottom belt hopper 1.

Figure 3:
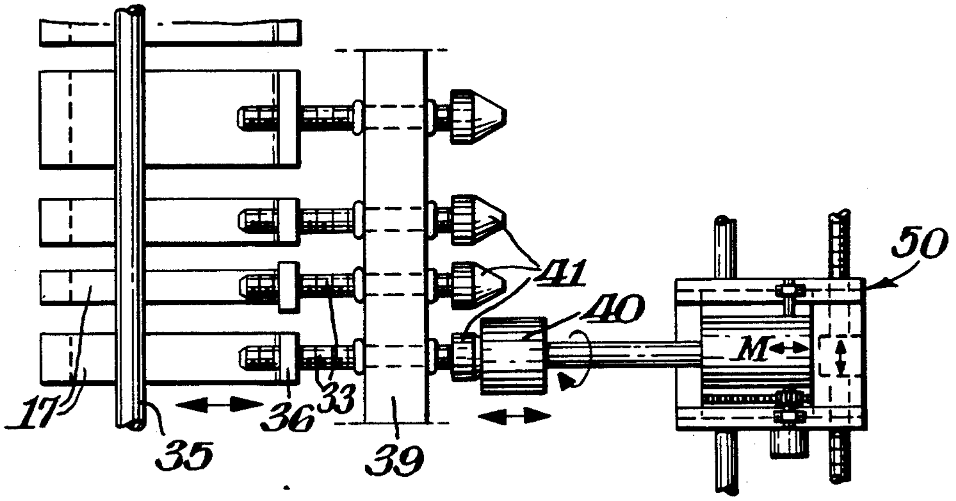
FIG. 3 is an enlarged cross section detail of the adjustment arrangement for the individual tongues of FIG. 1.
Figure 4:
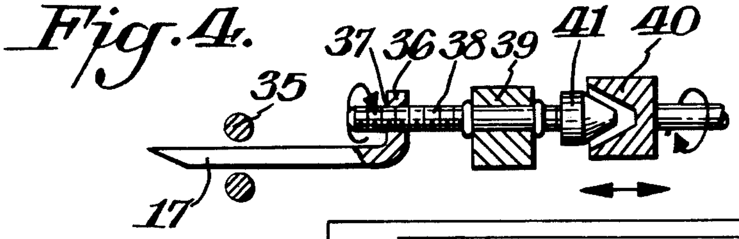
FIG. 4 is a top plan view of the arrangement shown in FIG. 3.

FIGS. 3 and 4 show tongues 17 extending into the material flow 13 as well as a guide plate 19 within the angular scraper 34, which removes the material taken off by the tongues 17 by moving along the inside of the guide plate 19 and returns it into the bottom belt hopper with no spill, this due to the angular design.

The embodiment illustrated in FIGS. 3 and 4 of the adjustment of a tongue 17 shows the tongue 17 in a roller bearing 35. At its rear end 36, the tongue 17 has a threaded boring 37, which works in conjunction with a threaded pin 38. The threaded pin 38 is attached with a bearing in a guide 39 and is moved into or out of the material flow 13 by its threading head 41, namely by turning the setting drive 40, which is most simply designed as a bored lining, to the right or to the left for its area of the material flow 13.

Corresponding to a division of the entire spreading width between a great number of such tongues 17, which are arranged side by side, the guide 39 can be supported to the left and right of the spreading width as a tie-bar extending over the entire spreading width. In this case, the setting drive 40 moves from tongue 17 to tongue 17 across the material flow and sets each individual tongue according to the information received from the control 14. Mechanism 50 is used to shift the setting drive 40 into and out of engagement with the individual heads 41, and also to move the setting drive transversely from one head 41 to another. Mechanism 50 is diagrammatically illustrated and all functions thereof are preferably automatic in nature.

Figure 5:
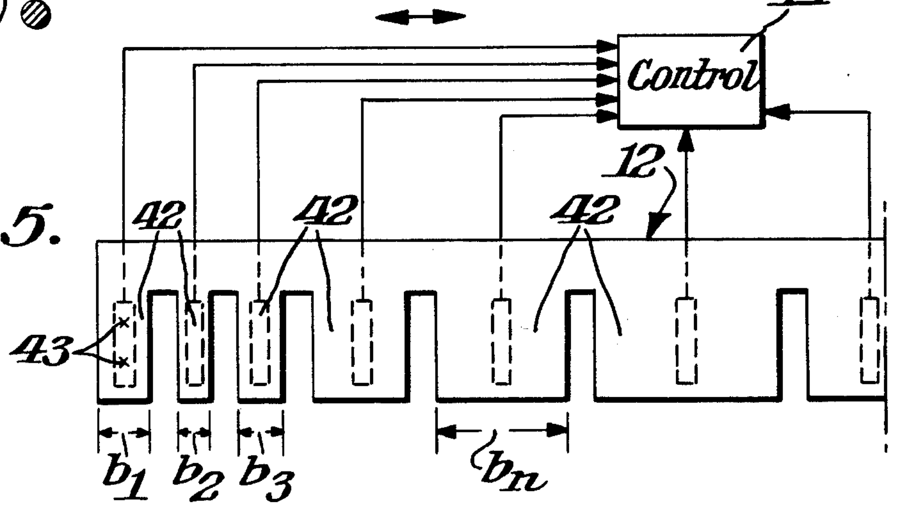
FIG. 5 is a top plan view of the measuring surface of the apparatus shown in FIG. 1.

The measuring surface 12 represented in FIG. 5 consists of a number of plates 42, the individual widths $b_1$ through $b_n$ of which are selected according to known requirements. For instance, if it has been found by measurements of the finished particleboard that the greatest density fluctuations always occur at the edge of the panel, it will be advisable to provide small widths b in this area. The individual plates 42 are provided with measurement strips 43 in the form of strain guages attached on the underside of each plate. It is thus possible to measure the momentary weight distribution over a specific partial width of the entire spreading width. The weight distribution image over the spreading width s as shown in FIG. 8 is thus created without need to move a narrow plate over the guide surface 31. The degree of deflection of the individual plates 42 is measured by the strain guages 43, such deflection being an indication of the weight of material flowing over a particular plate and causing the deflection. Signals from the strain guages are fed to control 14 for adjustment of the corresponding tongues 17.

In their simplest form, the tongues 17 are developed corresponding to the plates 42 in respect to width so that there is a direct correlation between the measured momentary distribution and the quantity to be removed.

FIGS. 1 and 8 show that the distribution weight $\overline{W}$ is a function of the spreading width s and time t, and that the average or actual weight $\overline{W}$ is a function of time t. Also, the speed of rotation n of the drive 21 for the belt 5 is a function of time t.

What is claimed is:

1. A method for equalizing the density distribution in pressed wood panels manufactured from adhesive coated bulk material comprising measuring the weight distribution over a transverse cross section of the bulk material as the material is flowed from storage onto a forming belt, producing command signals representative of such weight distribution, comparing those signals to a signal representative of a predetermined nominal density distribution over the transverse cross section of the material flow path, and removing weight quantities along the transverse cross section where the command signals indicate excess weight distribution to thereby produce equal density distribution throughout the pressed wood panel.

2. A method as in claim 1 including the steps of measuring the total weight of the amount of coated bulk material to be formed into a panel, comparing that weight to a nominal weight value, and adjusting the flow rate to obtain a nominal weight panel.

3. Apparatus for manufacturing pressed wood panels comprising a hopper, a feeder for supplying the hopper with adhesive coated bulk material, the discharge width of the hopper corresponding to the spreading width for the pressed wood panels to be manufactured, devices below the discharge of the bottom belt hopper for downwardly transporting the bulk material in the form of continuous chip mass onto a forming belt, a material guide surface extending the entire spreading width, a weight measuring surface next to the material guide surface for determining the weight of the flowing bulk material at various transverse locations along the spreading width, control means for comparing the weight determined by the measuring surface with a nominal weight value for the particular transverse location being weight measured and thereafter producing a control signal representative of the comparison, and adjustment means at the discharge of the hopper along the entire spreading width for varying the flow of bulk material at the various transverse locations in response to the control signals.

4. Apparatus as in claim 3 wherein the weight measuring surface consists of a plurality of individual plates arranged along the spreading width, each plate having a weight measuring strip device.

5. Apparatus as in claim 3 wherein the weight measuring surface consists of a single narrow plate constructed and arranged for movement to a plurality of locations along the spreading width.

6. Apparatus as in claim 3 wherein the hopper is a bottom belt hopper, and means controlling the speed of the bottom belt to thereby increase or decrease the mass of bulk material discharged from the hopper.

7. Apparatus as in claim 3 wherein the discharge cross section of the hopper is covered by a scraper belt for recycling selected amounts of bulk material from the discharge back to the hopper.

8. Apparatus as in claim 5 wherein the narrow plate is pivotally attached at the upper end thereof to a lever, and a device for measuring force at the other end of the lever for determining the weight of the bulk material flowing over the narrow plate.

9. Apparatus as in claim 8 including motivating means for moving the narrow plate across the spreading width for determining the weight of bulk material at each of the plurality of locations along the width.

10. Apparatus as in claim 9 wherein the motivating means includes a threaded rod supported in parallel relationship to the spreading width, mounting means for the narrow plate including an internal threaded support that receives the threaded rod, and means for rotating the threaded rod whereby the narrow plate transverses the spreading width to the plurality of weight measuring locations.

11. Apparatus as in claim 3 wherein the discharge adjusting means along the entire spreading width includes a plurality of tongues arranged in side-by-side fashion adjacent the hopper discharge, and motivating means connected to each tongue for moving it into and away from the flow of bulk material.

* * * * *